Patented Dec. 5, 1933

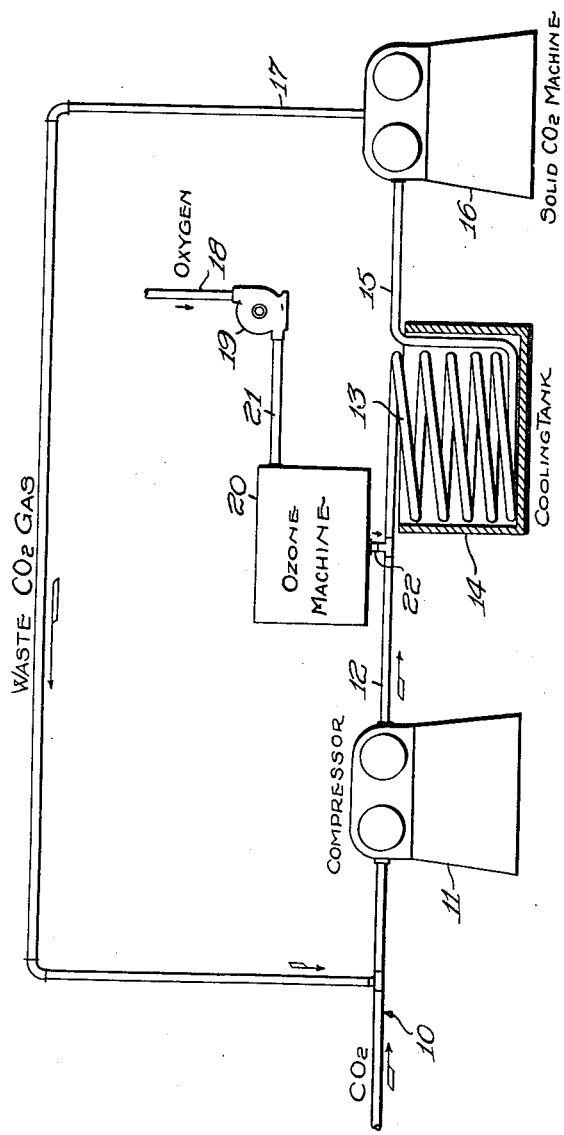

1,937,832

UNITED STATES PATENT OFFICE 1,937,832

DEODORIZATION OF CARBON DIOXIDE

Ralph H. McKee, Jersey City, N. J.

Application March 7, 1930. Serial No. 434,086

2 Claims. (Cl. 23—150)

This invention relates to the deodorization of carbon dioxide and more particularly to a process and apparatus for preparing liquid and solid carbon dioxide which will be free from the usual objectionable odors. In the manufacture of solid carbon dioxide by the numerous methods now in use, difficulty is encountered due to the odorous materials present in the final product. The use of solid carbon dioxide in the presence of food products has increased extensively in recent years, and this use of the material has rendered exceedingly important the presence of odorous materials in the carbon dioxide.

The odorous materials present in carbon dioxide depend upon the source and method of manufacturing the material. For example, the odor may be due in part to the coal or coke used in making the carbon dioxide, and also from the lubricating oil used in the compressor by which the liquid carbon dioxide is compressed to high pressures. These compressors heat up during operation, under which condition there is some decomposition of the lubricating oil, thus giving odorous hydrocarbons. The amount of odorous material present is extremely small, often amounting to only 0.001 per cent. or less.

In this connection it is recognized that carbon dioxide itself has a faint odor even when perfectly pure, but for practical purposes, pure carbon dioxide may be stated to be approximately odorless in character.

An important object of the present invention is to provide an extremely simple process for rendering carbon dioxide substantially odorless.

A further object is to provide a process, cooperatively associated with the usual process of liquefying and/or solidifying carbon dioxide, for rendering such material approximately odorless.

A further object is to provide a process of rendering carbon dioxide substantially odorless by introducing a deodorizing agent into such material as it passes through a liquefying and/or solidifying system.

A further object is to provide apparatus operative in conjunction with a carbon dioxide liquefying and/or solidifying system for introducing a deodorizing agent into the stream of carbon dioxide.

In its broader aspects, my invention comprises contacting carbon dioxide and ozone, which latter material changes the objectionable odorous materials to harmless odorless materials. In some cases, the ozone apparently oxidizes some of the objectionable materials to form carbon dioxide and water, both of which are innocuous. In other cases other compounds are formed, the character of which depends upon the source of the odor, and also upon the relative excess of ozone present. Ordinarily, only a very slight excess of ozone is needed to accomplish the desired result.

In the preferred practice of the process, carbon dioxide would be made and compressed, say to about 1000 pounds per square inch and cooled, as is the customary commercial procedure of making liquid carbon dioxide. This material is then fed to the usual apparatus which changes it to solid carbon dioxide, the waste gases being fed back into the system. The ozone is injected into the carbon dioxide stream preferably, but not necessarily, after it has left the compressor but before it has been cooled to liquid form.

Only a small amount of ozone need be injected into the system, the amount ordinarily being approximately 0.01 per cent. by weight of ozone. This will react with the odorous materials, and odorless materials will be produced thereby. The required ozone readily may be made by passing oxygen from an oxygen cylinder (under approximately 1800 pounds pressure) through a small ozone apparatus and from such apparatus through a preferably short pipe into the carbon dioxide stream preferably as it leaves the compressor. The immediate introduction of the ozone from the ozone apparatus into the carbon dioxide stream through the short pipe referred to is preferable in order that decomposition of the ozone may be minimized.

The pressure of the oxygen under the conditions referred to will be ample to force the mixture of oxygen and ozone into the carbon dioxide pipe even though the carbon dioxide is under a pressure of approximately 1000 pounds per square inch. In this connection, it may be stated that there is no particular difficulty in adjusting the usual ozone apparatus so that it will transform to ozone 10 per cent. of the oxygen fed into it, though if the percentage of concentration of ozone is increased, less volume will be needed.

It is recognized that the oxygen which contains the ozone, and the oxygen which may be formed from the ozone when it is acting as an oxidizing agent, will constitute inert gas in the carbon dioxide system. However, such inert gas will be present in such small amounts that it readily can be taken care of in the usual way along with the other inert gases customarily present in such apparatus.

In the accompanying drawing, I have illustrated diagrammatically one form of apparatus suitable for use in the practice of my process.

Referring to the drawing, the numeral 10 designates a pipe for conducting carbon dioxide gas from a suitable source to any standard type of compressor 11. From the compressor, the compressed carbon dioxide gas is conducted by a pipe 12 through a cooling coil 13 arranged in the usual tank 14. During its passage through the cooling coil 13, the carbon dioxide will liquefy, as will be apparent.

The liquid carbon dioxide passes from the outlet end of the coil 13 through a pipe 15 to a conventional solidifying machine 16, from which the solidified carbon dioxide is taken off in the usual manner. The waste carbon dioxide and other gases are conducted from the solidifying machine 16 back to the supply pipe 10 through a suitable pipe 17.

Oxygen which is to be converted into ozone is derived from a suitable source through a pipe 18 which may be led to the intake side of a pump 19, or the oxygen at the source may be maintained under the desired pressure. The oxygen is fed into a standard ozone machine 20 through a pipe 21, and the generated ozone is fed from the ozone machine 20 preferably into the pipe 12 through a short pipe connection 22.

The relatively short pipe 22 preferably is employed in order that the generated ozone may be fed immediately into the carbon dioxide stream before material decomposition of the ozone takes place. In this connection, it will be noted that the ozone is preferably fed into the carbon dioxide stream between the compressor and the cooling tank, that is, at a point where the carbon dioxide is under substantial pressure but has not yet liquefied. The procedure described is preferred, but the invention is not limited to the contacting of the carbon dioxide with the ozone at any specific point in the system.

The practice of the process and the operation of the apparatus will be apparent from the foregoing description. The invention consists in its broader aspects in the contacting of carbon dioxide with ozone, and the contacting of these materials preferably takes place in conjunction with a carbon dioxide liquefying and solidifying system at a point between the compressor and the cooling tank in which the carbon dioxide gas becomes liquid.

The ozone changes the objectionable odorous materials to harmless odorless materials. This result is due to some extent to the fact that the ozone apparently oxidizes some of the materials to carbon dioxide and water while other compounds also are formed, the character of which depends upon the source of the odor and also upon the relative excess of ozone present. As previously stated, only a very slight excess of ozone is needed to accomplish the desired results, namely, the production of approximately odorless carbon dioxide.

As previously stated, the oxygen may be maintained at its source under a pressure in excess of the pressure present at the point of introduction of the ozone into the carbon dioxide system, in which case the pressure in the oxygen is sufficient to introduce the ozone into the stream of carbon dioxide in the manner described. The oxygen and ozone of course may be fed into the system through the medium of the pressure generated by the pump 19 if the oxygen at the source is not maintained under sufficient pressure for this purpose.

By the term "industrial carbon dioxide" as used in the claims is meant a carbon dioxide of high concentration such as is used for preparing liquid and/or solid carbon dioxide.

While I have described in detail the preferred practice of my process and a preferred form of apparatus with which it is to be used, it is to be understood that the form of apparatus and the details of procedure of the process may be widely varied without departing from the spirit of the invention or the scope of the subjoined claims.

I claim:

1. The process of deodorizing industrial carbon dioxide containing odorous impurities which comprises contacting said impure carbon dioxide under pressure with approximately 0.01 per cent. by weight of ozone.

2. The process of deodorizing industrial carbon dioxide containing odorous impurities which comprises contacting said impure carbon dioxide under a pressure of approximately 1000 pounds per square inch with approximately 0.01 per cent. by weight of ozone.

RALPH H. McKEE.